(12) United States Patent
Inoue et al.

(10) Patent No.: US 9,383,980 B2
(45) Date of Patent: Jul. 5, 2016

(54) DETERMINING A METHOD TO INLINE USING AN ACTUAL FOOTPRINT CALCULATION

(71) Applicant: International Business Machines Corporation, Armonk, NY (US)

(72) Inventors: Hiroshi Inoue, Tokyo (JP); Takuya Nakaike, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/186,136

(22) Filed: Feb. 21, 2014

(65) Prior Publication Data

US 2014/0245274 A1    Aug. 28, 2014

(30) Foreign Application Priority Data

Feb. 22, 2013    (JP) .................. 2013-032961

(51) Int. Cl.
*G06F 9/45*    (2006.01)

(52) U.S. Cl.
CPC .................. *G06F 8/4443* (2013.01)

(58) Field of Classification Search
None
See application file for complete search history.

(56) References Cited

U.S. PATENT DOCUMENTS

2004/0205409 A1*    10/2004    Wu et al. ................ 714/38

FOREIGN PATENT DOCUMENTS

| JP | 06202875 A | 7/1994 |
|---|---|---|
| JP | 07129412 A | 5/1995 |
| JP | 10312291 A | 11/1998 |
| JP | 10326193 A | 12/1998 |
| JP | 2000035891 A | 2/2000 |
| JP | 2001005673 A | 1/2001 |
| JP | 2002525707 A | 8/2002 |
| JP | 2004118367 A | 4/2004 |
| JP | 2007018254 A | 1/2007 |
| JP | 2010140344 A | 6/2010 |

OTHER PUBLICATIONS

Arnold, Matthew et al., Online Feedback-Directed Optimization of Java, Proceedings of the 17th ACM SIGPLAN Conferenece on Object-Oriented Programming, Systems, Languages, and Applications, 2002, 19 pages.

(Continued)

*Primary Examiner* — Li B Zhen
*Assistant Examiner* — Amir Soltanzadeh
(74) *Attorney, Agent, or Firm* — Cantor Colburn LLP; Maeve Carpenter

(57) ABSTRACT

Techniques for calculating the actual footprint of a computer-implemented method are disclosed. An example computer-implemented method includes a computer creating a map indicating to which code method each instruction included in compiled code belongs. This computer-implemented method also includes the computer sampling instructions executed using a hardware performance counter. This computer-implemented method also includes the computer mapping the sampled instructions to the code methods to which the instructions belong using the map. This computer-implemented method also includes the computer calculating the actual footprint of each code method as the total number of instructions sampled at least once among the instructions belonging to the code methods.

12 Claims, 11 Drawing Sheets

(a)

(b)

(56) References Cited

OTHER PUBLICATIONS

Arnold, Matthew et al., "A Comparative Study of Static and Profile-Based Heuristics for Inlining", ACM SIG PLAN Workshop on Dynamic and Adaptive Compilation and Optimization, 2000, 13 pages.

Ayers, Andrew et al., "Aggressive Inlining", Proceedings of the ACM SIGPLAN Conference on Programming Language Design and Implementation, 1997, 12 pages.

Boehm, Omer et al., "Aggreessive Function Inlining with Global Code Reordering", IBM Research Report, H-0247 (HO611-009), Nov. 15, 2006, Computer Science, 26 pages.

Cavazos, John et al., "Automatic Tuning of Inlining Heuristics", Proceedings of the 2005 ACM/IEEE SC Conference, 2005, 11 pages.

Chakrabarti, Dhruva R. et al., "Inline Analysis: Beyond Selection Heuristics", Proceedings of the International Symposium on Code Generation and Optimization, 2006, 12 pages.

Chang, Pohua P. et al., "Profile-guided Automatic Inline Expansion for C Programs", Software—Practice and Experience vol. 22 (5), May 1992, pp. 349-369.

Hazelwood, Kim et al., "Adaptive Online Context-Sensitive Inlining", Proceedings of the International Symposium on Code Generation and Optimization: Feedback Directed and Runtime Optimization, 2003, 12 pages.

Inoue, Hiroshi et al., "How a Java VM Can Get More from a Hardware Performance Monitor", Proceedings of the ACM SIGPLAN International Conference on Object-Oriented Programming, Systems, Languages and Applications, 2009, 18 pages.

McFarling, Scott et al., "Procedure Merging with Instruction Caches", Proceedings of the ACM SIGPLAN Conference on Programming Language Design and Implementation, 1991, 9 pages.

"A System Profiler for Linux", OProfile website, Aug. 28, 2013, located at http://oprofile.sourceforge.net/about/, 3 pages.

Suganuma, Toshio et al., "Design and Evaluation of Dynamic Optimizations for a Java Just-In-Time Compiler", ACM Transactions on Programming Languages and Systems, vol. 27, No. 4, Jul. 2005, pp. 732-785.

Zhao, Peng et al., "To Inline or Not to Inline? Enhanced Inlining Decisions", 16th Workshop on Languages and Compilers for Parallel Computing, 2003, 15 pages.

M.J. Serrano, et al., "Placement Optimization Using Data Context Collected During Garbage Collection," ISMM'09, ACM, Jun. 19-20, 2009, pp. 69-78.

\* cited by examiner

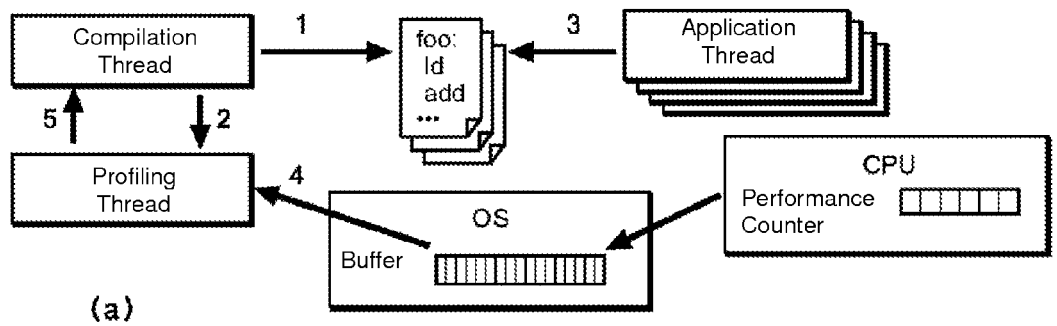
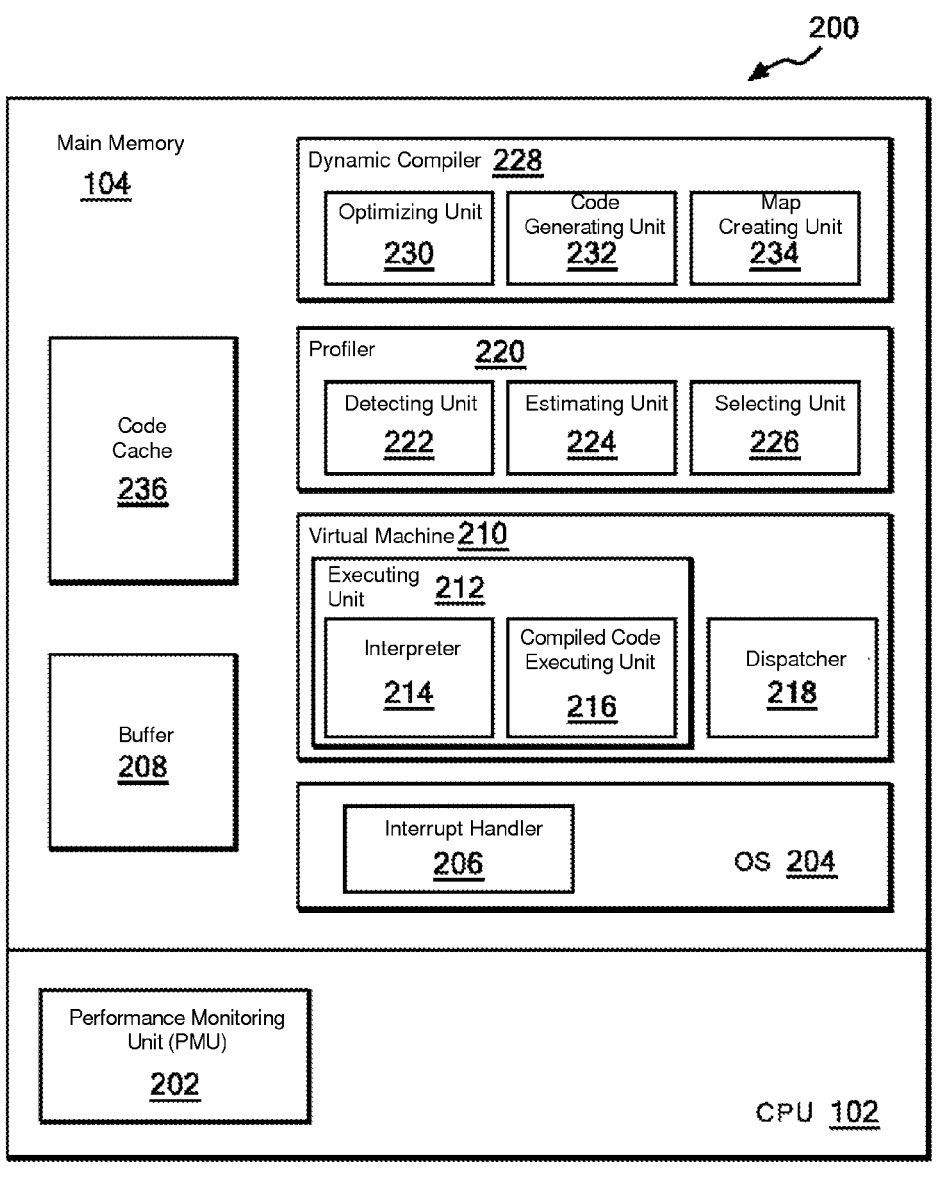
FIG. 2

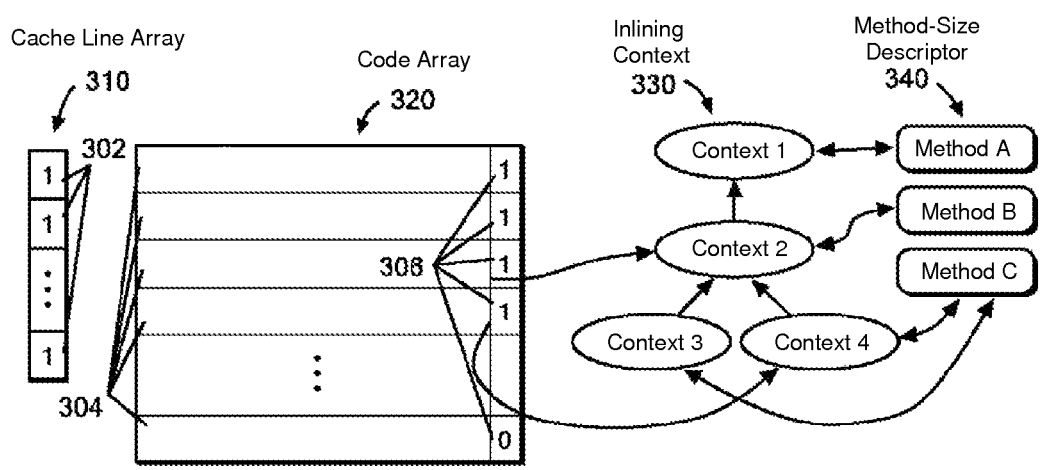
(a)
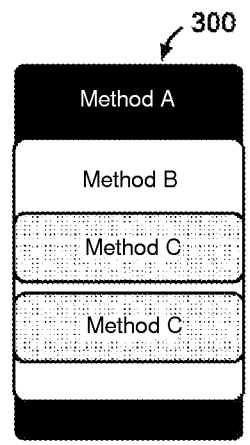
(b)
FIG. 3

(a)
```
struct Context {
    int size;
    Context *parent;
    MethodSize *mtd;
};
```
} 402

```
struct MethodSize {
    int size;
    int maxSize;
    int numActive;
    int numContexts;
    Context **context;
};
```
} 404

(b)
```
void countSize(Context *ctx) {
    if (ctx->size == 0)
        ctx->mtd->numActive++;

ctx->size++;
    ctx->mtd->size++;

if (ctx->size > ctx->mtd->maxSize)
        ctx->mtd->maxSize = ctx->size;

if (ctx->parent != NULL)
        countSize(ctx->parent);
}
```

FIG. 4

(a)
```
double computeBenefit(MethodSize *mtd) {
return (mtd->size - mtd->maxSize) /mtd->numActive;
}
```

(b)
```
void selectUninliningTargets() {
targetSize = maxSize * targetReductionRatio;
reducedTarget = currentSize - targetSize;
if (reducedTarget <= 0)
return;

sortByBenefits(mtdSizes);

reducedSize = 0;
for (i = 0; i < NumMethods; i++) {
mtd = mtdSizes[i];
if (mtd->numActive > 1) {
addUninliningTarget(mtd);
reducedSize += (mtd->size - mtd->maxSize);
if (reducedSize >= reducedTarget)
return;
}
}
}
```

FIG. 5

DETERMINING A METHOD TO INLINE USING AN ACTUAL FOOTPRINT CALCULATION

PRIORITY

This application claims priority to Japanese Patent Application No. 2013-032961, filed Feb. 22, 2013, and all the benefits accruing therefrom under 35 U.S.C. 119, the contents of which in its entirety are herein incorporated by reference.

BACKGROUND

The present disclosure relates to compiler optimization, and more specifically, to a technique for inlining code.

Inlining is a technique in which code defined by a method or function is expanded and embedded directly at the site where it was called, and is one of the most effective compiler optimization techniques. Inlining can reduce call/return overhead, expand the optimization range, and improve the spatial locality of the code. However, excessive inlining can increase cache misses and increase compilation times.

One technique for suppressing inlining involves a threshold value. When this technique is used, the inlining threshold value is determined so as to take into account the tradeoffs mentioned above and to establish a balance between the costs and benefits of inlining. However, because the threshold value determined in this way is applied to a static footprint (that is, to a footprint including code that is not actually run), the size of the actual footprint (that is, the size of the code that is actually run) cannot be effectively reduced. For example, there is a possibility that a method with a large static footprint in which only some of the code is run will not be inlined, and the method will perform poorly because of the call overhead.

Another technique involves an optimum inline threshold value that is calculated using machine learning. This technique is beneficial when a compiler developer tune inlining threshold values. However, the computational cost of machine learning is high, and is difficult to apply to dynamic compilation.

Yet another technique involves inserting instrumented code into a program, collecting profile information to identify call frequencies, and using the collected profile information to perform efficient inlining during recompiling.

Still another technique involves extracting common elements of a program on the basis of an execution trace, and determining, based on the number of times an instruction is actually run, whether or not the common elements are to be assembled as one element.

Yet another technique involves estimating the actual footprint after inlining on the basis of instruction execution frequency. When using this technique, instrumented code is inserted into a program, and the average execution frequency is obtained each time the basic blocks in the loop have been repeated. Then, the actual footprint of the loop is obtained using the number of instructions inside the basic blocks and their execution frequency.

However, inserting instrumented code into programs and using execution traces have a high profile overhead and are difficult to apply to dynamic compilation.

SUMMARY

Embodiments disclosed herein include a computer-implemented method for calculating the actual footprint of a code method. The computer-implemented method includes creating, in a computer, a map. The map indicates which code method, of a plurality of code methods, each instruction included in compiled code belongs to. The computer-implemented method also includes sampling a plurality of executed instructions using a hardware performance counter in the computer. The computer-implemented method also includes using the created map to map, in the computer, the sampled instructions to the code methods to which the instructions belong. The computer-implemented method also includes calculating the actual footprint of each code method as the total number of executed instructions sampled at least once among the instructions belonging to the code methods.

Embodiments disclosed herein include a system for calculating the actual footprint of code methods in compiled code. The system includes a memory having computer readable computer instructions and a processor for executing the computer readable instructions. The instructions include creating a map indicating which code method, of a plurality of code methods, each instruction included in compiled code belongs to. The instructions also include sampling a plurality of executed instructions using a hardware performance counter in the system. The instructions also include using the created map to map the sampled instructions to the code methods to which the instructions belong. The instructions also include also include calculating the actual footprint of each code method as the total number of executed instructions sampled at least once among the instructions belonging to the code methods.

Embodiments disclosed herein include a computer program product. The computer program product includes a computer readable storage medium having program code embodied therewith. The program code is executable by a processor for creating a map indicating which code method, of a plurality of code methods, each instruction included in compiled code belongs to. The program code is also executable for sampling a plurality of executed instructions using a hardware performance counter in the system. The program code is also executable for using the created map to map the sampled instructions to the code methods to which the instructions belong. The program code is also executable for calculating the actual footprint of each code method as the total number of executed instructions sampled at least once among the instructions belonging to the code methods.

BRIEF DESCRIPTION OF THE SEVERAL VIEWS OF THE DRAWINGS

FIG. 2 (*a*) is a diagram outlining the mechanism used to determine an object to inline in an embodiment disclosed herein.

FIG. 2 (*b*) is a diagram used to explain the software configuration for the inline object determining program in an embodiment disclosed herein.

FIG. 3 (*a*) is a diagram used to explain the relationship between the four types of data structures constituting a map, according to an embodiment disclosed herein.

FIG. 3 (*b*) is a diagram showing an example of the hierarchical relationships between inlined methods, according to an embodiment disclosed herein.

FIG. 4 (*a*) is a diagram showing the data structures of an inlining context and a method size descriptor, according to an embodiment disclosed herein.

FIG. 4 (*b*) is a diagram showing an example of pseudo code in the countSize function used to calculate an actual footprint, according to an embodiment disclosed herein.

FIG. 5 (a) is a diagram showing an example of pseudo code in the computeBenefit function used to calculate the benefit of uninlining, according to an embodiment disclosed herein.

FIG. 5 (b) is a diagram showing an example of pseudo code in the selectUninliningTarget function used to select a method not to inline, according to an embodiment disclosed herein.

FIG. 8 (b) is a diagram of an example of a flowchart of the processing for the countSize function, according to an embodiment disclosed herein.

FIG. 10 (b) is a diagram showing test results for instruction cache misses, according to an embodiment disclosed herein.

FIG. 11 (b) is a diagram showing test results for overhead, according to an embodiment disclosed herein.

DETAILED DESCRIPTION

Some embodiments disclosed herein provide a technique for calculating the actual footprint or size of code that is actually executed while suppressing overhead. Some embodiments disclosed herein provide a technique for determining a method suitable for inlining on the basis of the actual footprint calculated in this manner.

The following is an explanation of various embodiments with reference to the drawings. However, these embodiments do not limit the present invention. Also, not all combinations of characteristics explained in a particular embodiment are necessarily required in the technical solution of the present invention. In the entire explanation of the embodiments, identical elements are denoted by the same numbers.

Figure 1:
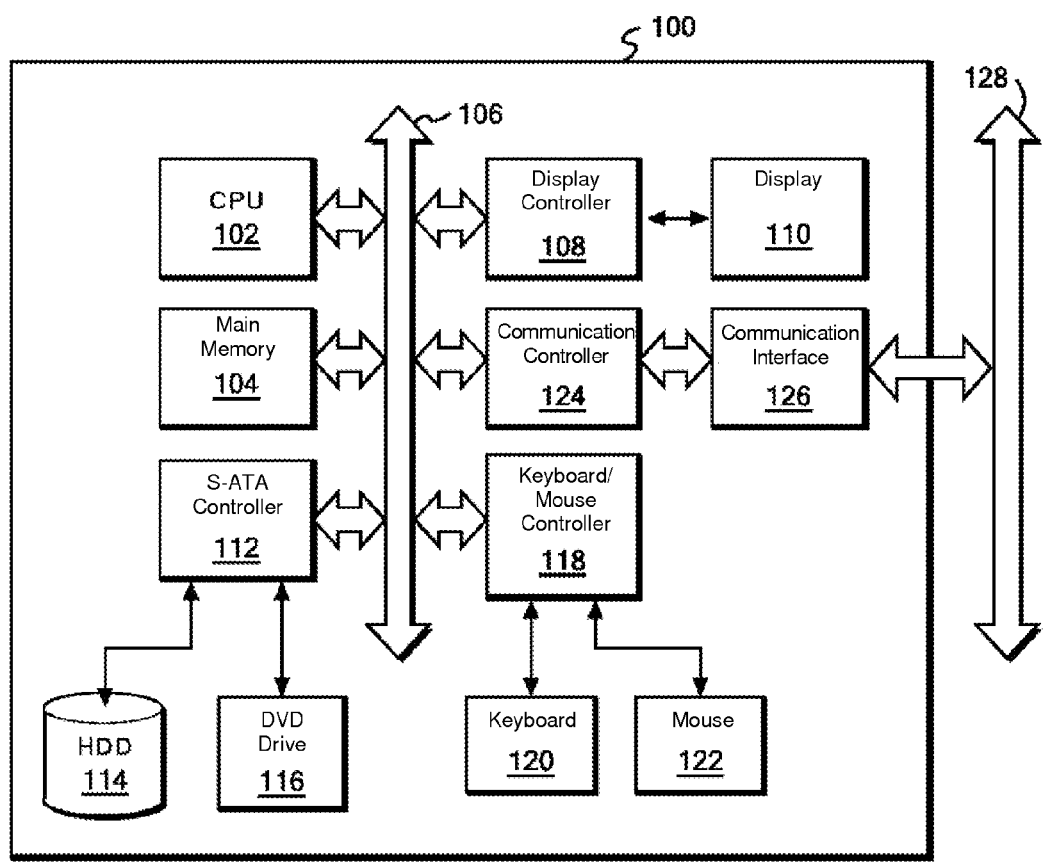
FIG. 1 shows an example of a hardware configuration for the computer system in an embodiment disclosed herein.

FIG. 1 shows an example of a hardware configuration for a computer system 100 in a preferred embodiment of the present invention. The computer system 100 includes a main CPU (central processing unit) 102 and a main memory 104 connected to a bus 106. The CPU (102) is preferably based on a 32-bit or 64-bit architecture. Examples that can be used include the Core i™ series, Core 2™ series, Atom™ series, Xeon™ series, Pentium® series or Celeron® series from Intel Corporation, or the Phenom™ series, Athlon™ series, Turion™ series, or Sempron™ from Advanced Micro Devices. The main memory 104 preferably has a capacity of 1 GB or more, and more preferably a capacity of 2 GB or more.

A display 110 such as a liquid crystal display (LCD) may be connected to the bus 106 via a display controller 108. The display 110 may be used to control the computer and display on the appropriate graphic interface information from a computer connected to the network via a communication line and information related to the software running on the computer.

A disk 114, such as a silicon disk or hard disk, may be connected to the bus 106 via a SATA or IDE controller 112. A drive 116 such as a CD, DVD or BD drive, may also be connected to the bus 106 via a SATA or IDE controller 112. A keyboard 120 and mouse 122 may be optionally connected to the bus 106 via a keyboard/mouse controller 118 or USB bus (not shown), but this is not necessary to the embodiment of the present invention.

An operating system, a Java® processing environment such as J2EE, Java applications, and Java virtual machines (VM), as well as other programs and data, may be stored for loading into the main memory 104.

The operating system may be LINUX, the Windows® operating system from Microsoft Corporation, MacOS® or iOS® from Apple Computer Incorporated, or a UNIX®-based system incorporating an X Window System, such as AIX® from International Business Machines Corporation®.

Working with the operating system, instructions can be provided to the CPU 102 to record, to the disk 114, embodiments of a computer program disclosed herein. Embodiments of the actual footprint calculation program and of the inline object determining program can be installed along with related data in the computer system 100 and recorded on the disk 114.

The actual footprint calculation program includes a map creating module, an interrupt handler, and an estimating module. The programs and modules work with the CPU 102 so that computer program 100 functions as the map creating unit 234, interrupt handler 206 and estimating unit 224 described below. The inline object determining program includes a selecting module along with the configurational elements of the actual footprint calculating program. These programs and modules work with the CPU 102 so that the computer system 100 functions as the map creating unit 234, interrupt handler 206, estimating unit 224, and selecting unit 226 described below.

The computer program can be compressed or divided and stored on a plurality of media. If necessary, a drive 116 may be used to install the program on the disk 114 from a CD-ROM, DVD-ROM, or BD.

The communication interface 126 can use, for example, an Ethernet® protocol. The communication interface 126 is connected to a bus 106 via a communication controller 124, and functions to physically connect the computer system 100 to the communication network 128. This provides a network interface layer for the TCP/IP communication protocol in the communication function of the operating system of the computer system 100. The communication link can be implemented as a wired LAN environment, wireless LAN environment, or Wi-Fi standard such as IEEE 802.11a/b/g/n.

It should be readily understood that the computer system 100 used in the embodiments disclosed herein can be realized using an ordinary information processing device such as a personal computer, workstation or mainframe, or any combination of these. The configurational elements explained above are for illustrative purposes only, and all of the configurational elements are not necessarily configurational elements required to embody the present invention.

FIG. 2 (a) is a diagram outlining the mechanism used to determine an object to inline in an embodiment disclosed herein. The compiler performs various types of optimization (1) including inlining to generate code, and creates (2) a map indicating which method each instruction included in the compiled code belongs to. Next, an application runs (3) the compiled code, and the profiler samples the instructions being run using a hardware performance counter. Next, the profiler references (4) the created map to map the sampled instructions to the methods to which the instructions belong, and estimates the actual footprint of each method as the total number of instructions sampled at least once among the instructions belonging to the method. The profiler determines (5) a method to be inlined by determining the methods to be released from inlining on the basis of the estimated actual footprints, and instructs the compiler to recompile those to be released from inlining. The following is a detailed explanation of each constituent element with reference to FIG. 2 (b).

FIG. 2 (b) is a diagram showing an example of a software configuration for the computer system 100 shown in FIG. 1. The CPU 102 retrieves a Java™ virtual machine (VM) and an inlining object determining program according to an embodiment of the invention including, as a part, an actual footprint calculating program according to an embodiment of the invention from the disk 114 and executes them in the main memory 104 to expand the operating system 204, virtual machine 210, profiler 220, and dynamic compiler 228 in the main memory 104. The CPU 102 also has a performance monitoring unit (PMU) 202.

The PMU 202 has a set of functions usually incorporated into conventional processors, and monitors the occurrence of events specified by the internal behavior of the CPU 102, counts the occurrence of events using an internal calculator, and performs a specified process when the count value reaches a threshold value. This function typically monitors the number of cycles executed by the CPU 102, the number of instructions executed, the number of branch prediction misses, and the number of data cache misses. In various embodiments disclosed herein, the functions of the PMU 202 are used by the profiler 220 to sample executed instructions, as described below.

The operating system 204 is software that provides the basic functions of the computer system 100 such as managing the CPU 102 and the memory. The operating system 204 also has an interrupt handler 206 used by the profiler 220 described below to sample the executed instructions. The specific processing performed by the interrupt handler 206 will be described below in relation to the profiler 220.

The virtual machine 210 is a simulator which interprets byte code and executes compiled code. The virtual machine 206 includes an executing unit 212 and a dispatcher 218. The executing unit 212 includes an interpreter 214 and a compiled code executing unit 216.

The dispatcher 218 references the code cache 236, which is an area in the memory used to store compiled code generated by the dynamic compiler 228 described below, in order to determine whether or not compiled code to be started at the byte code address to be executed next is stored in the code cache 236. The interpreter 214 slowly executes (interprets) the byte code to be processed when there is no compiled code. When the compiled code is present, the compiled code executing unit 216 acquires the compiled code from the code cache 236 and executes it.

The profiler 220 is a profiler that performs two different types of profiling. The profiler 220 selects a method to inline on the basis of these different types of profiling, and outputs the selected method information to the dynamic compiler 228 described below along with information in the program area to be compiled next. The profiler 220 includes a detecting unit 222, an estimating unit 224, and a selecting unit 226.

The detecting unit 222 performs a first type of profiling to detect the program area frequently executed by the executing unit 212 within a predetermined period of time immediately after the program was started, and outputs the results of the first type of profiling to the selecting unit 226. The selecting unit 226 searches for methods included in the frequently executed program area, and compares the methods to their static footprint and the acceptable code size for a single method to select methods to inline. The methods selected for inlining by the selecting unit 226 and information in the frequently executed program area are outputted to the dynamic compiler 228 described below. The acceptable code size for a single method is a code size that is established in advance to strike a balance between the advantages and disadvantages of inlining. However, the selection of methods to inline on the basis of static footprints is not restricted to this method, and other methods may be used. In some embodiments, the inlining performed on the basis of the results of the first type of profiling is more aggressive.

In the second type of profiling, the estimating unit 224 samples the executed instructions using a hardware performance counter, maps the sampled instructions to the methods to which these instructions belong, and calculates the total number of instructions sampled at least once among the instructions belonging to the methods. This mapping is performed by referencing a map which indicates whether or not each instruction included in the compiled code belongs to an inlined method. This map is created by the dynamic compiler 228 described below. The details of this mapping will be described below with reference to FIGS. 4(a) and (b) and to FIGS. 8(a) and (b). The results of the second type of profiling are outputted to the selecting unit 226, and the selecting unit 226 selects the methods to inline on the basis of the actual footprint calculated for each method.

The sampling of the executed code is performed more specifically in the following manner. The estimating unit 224 indicates an event in which the number of executed instructions exceeded a predetermined threshold value as a hardware event to be monitored by the PMU 202. The estimating unit 224 also instructs the PMU 202 to start the interrupt handler 206 when the number of executed instructions exceeds the predetermined threshold value. Thus, the PMU 202 generates an interrupt when the counter counting the number of executed instructions exceeds the predetermined threshold value, and the interrupt handler 206 started by the generated interrupt stores in the buffer 208 the address of the instruction causing the interrupt that is received in the report from the PMU 202. The estimating unit 224 starts the sampling using a system call, and is then blocked until the buffer 208 is full of the addresses of instructions that have caused an interrupt. When the block is released, the estimating unit 224 acquires the sampling results from the buffer 208.

The estimate of actual footprints is performed more specifically in the following manner. The estimating unit 224 calculates the size of each context generated by inlining a method as the total number of instructions sampled at least once among the instructions constituting the contexts. The estimating unit 224 also calculates the total size of the contexts corresponding to the method as the overall actual footprint of the method. The estimating unit 224 treats the overall actual footprint of the method as the actual footprint of the method. Next, the selecting unit 226 selects the methods to inline by determining the methods to be released from inlining among the inlined methods on the basis of the overall actual footprint of each method.

The selection of methods to be released from inlining on the basis of the overall actual footprint of each method is performed more specifically in the following manner. First, the selecting unit 226 subtracts the largest size among the sizes of the contexts corresponding to each method from the overall actual footprints of the method, and uses the resulting value as the reduction value for reducing the overall code size when the method is to be excluded from inlining. Here, the maximum context size is subtracted from the overall actual footprint because the inlined method includes the contexts generated when the method was compiled. Also, the code size of the root method remains even after a method has been excluded from inlining.

Next, the selecting unit 226 divides the reduction value of each method by the number of contexts whose size does not equal 0 (i.e., the number of active contexts, among the contexts corresponding to the method. The resulting value indicates the magnitude of the benefit obtained by excluding the method from inlining. Here, the reduction value of each method is divided by the corresponding number of active contexts because the cost of recompiling a method which has been excluded from inlining is taken into account. This also leads to methods of a smaller size being excluded from uninlining because the demerits of the call/return overhead outweigh the merits of reducing the code size.

Next, the selecting unit 226 subtracts the reduction values of each method from the size of the compiled code in descending order according to their benefit value until the size of the compiled code is equal to or less than the target code size, and selects the remaining methods as methods to inline. In other words, the selecting unit 226 selects as methods to be released from inlining those methods whose reduction values were subtracted from the size of the compiled code. The selecting unit 226 excludes from the methods to be released from inlining those methods which do not have more than one active context. This is because methods which only have one active context do not have redundant code. Also, the selecting unit 226 excludes methods included among the compiled methods as root methods from methods to be released from inlining. This is done to prevent an increase in the number of code calls and the lengths of paths due to the excessive release of inlining. The target code size may be calculated as a value obtained by multiplying the largest total value, among the total values of the overall actual footprints already calculated for each method, by a predetermined reduction rate (for example, 0.9).

The second type of profiling performed by the estimating unit 224 and the selection of methods for uninlining by the selecting unit 226 on the basis of the results of the second type of profiling is performed periodically a predetermined interval after the initial compiling performed by the dynamic compiler 228. When the size of the compiled code is smaller than the target code size, execution of the series of processes performed by the estimating unit 224 and the selecting unit 226 may be paused for a fixed period of time. Alternatively or additionally, the estimating unit 224 may count the number of cache lines storing the sampled instructions, and the series of processes performed by the estimating unit 224 and the selecting unit 226 may be suspended for a fixed period of time when the number of cache lines is less than a predetermined threshold value.

The dynamic compiler 228 is a compiler which optimizes the program areas to be compiled next, including inlining, based on the results of the two types of profiling outputted by the profiler 220. The dynamic compiler, which also performs runtime compiling, includes an optimizing unit 228, a code generating unit 230, and a map creating unit 232.

For the initial compiling, the optimizing unit 228 performs optimization, including inlining, on the program area with high execution frequency based on the results of the first type of profiling. After the initial compiling, the optimizing unit 228 also performs uninlining of inlined methods on the basis of the results of the second type of profiling. The code generating unit 232 converts the optimized code outputted from the optimizing unit 230 to native code, and stores the resulting code in the code cache 236.

During compiling, the map creating unit 234 creates a map indicating which method each instruction in the compiled code belongs to. As mentioned above, a map created by the map creating unit 234 is used by the estimating unit 224 during runtime to map the sampled instructions to the methods they belong to. The following is an explanation of an example of a map created by the map creating unit 234 with reference to FIG. 3 (a) and FIG. 3 (b).

As shown in FIG. 3 (a), the map creating unit 234 constructs a map using four different data structures: cache line array 310, code array 320, inlining context 330, and method-size descriptor 340. The cache line array 310 and code array 320 are linked as a pair to a single compiled method via the address range of the method. When an instruction has been sampled, each entry in the pair of corresponding arrays is identified by determining whether or not the address of the instruction is in the data range of the method linked to the pair of arrays. The following is an explanation of each data structure with reference to FIG. 3 (a). The hierarchical relationships shown in FIG. 3 (b) are established between Methods A, B and C described in this drawing. Method B is called once inside Method A, and Method C is called twice inside Method B.

The cache line array 310 is used to count the total number of accessed cache lines. Each entry has a 1-bit field 302 which is indexed by the cache line offsets calculated using Equations (1) and (2) below. When the value in the 1-bit field of an entry corresponding to a sample instruction is 0, the total number of accessed cache lines is increased by 1, and the value of the field is set to 1 in order to avoid a redundant count of the same instruction.

$$\text{Cache line offset} = \text{Code offset} \gg \log_2 (\text{Size of a cache line}) - \quad (1)$$

$$\text{Code offset} = \text{instruction address} - \text{Code start address} - \quad (2)$$

The code array 320 is used to count the total number of instructions executed by each method. Each entry corresponds to a single instruction included in a compiled method, and is indexed by the code offset calculated using Equation (2) above. Each entry has a field 304 for storing a pointer indicating the inlined context, and an access bit field 306 indicating whether or not the corresponding instruction has been executed. The access bit field 306 when the entry is accessed for the first time in order to count the total number of instructions executed at least once while also avoiding a redundant count of the same instruction.

The inlining context 330 has a data structure 402 which indicates the inlined context. The data structure 402 is described in detail below in connection with FIG. 4(a). Each instance of the inlining context 330 is generated when the method is inlined or compiled, and is associated with the corresponding instance in the method size descriptor 340. The pointer indicating each instance of the inlining context 330 is stored in the entry of the code array 320 corresponding to an instruction inside the inlined method. When a single method has been inlined at more than one call site, more than one instance of inlining context is generated for the method.

The method size descriptor 340 is used to calculate the size of an inlined method, and uses the data structure 404 (shown in FIG. 4(a)). Each instance of the method size descriptor 340 has a one-to-once correspondence with a method and is unique to each method.

The following is an explanation of the data structure 402 of the inlining context 330 and the data structure 404 of the method size descriptor 340 with reference to FIG. 4(a). The data structure 402 shown in FIG. 4(a) includes an int-type size, a reference-type parent for the data structure context, and a reference-type MethodSize for the data structure. When an instance of the inlining context 330 has been generated, the size is initialized with a value of 0. As described below with reference to FIG. 4(*b*), the size of the context is eventually established as the total number of instructions sampled at least once among the instructions constituting the context. The pointer to an instance of the inlining context 330 with a parent relationship is stored in parent, and the pointer to an instance corresponding to the method size descriptor 340 is stored in mtd.

The instructions constituting a context in relation to the size of the inlining context 330 include both instructions related to the corresponding inlined method and instructions in the method belonging to other inlined methods. Using the example shown in FIG. 3(*a*) and FIG. 3(*b*), Method C is inlined in Method B, so the size of context 2 includes the number of instructions executed in contexts 3 and 4. The size and parent of any entry in the inlining context 330 is also described in the size and parent of a context represented by the entry.

The data structure 404 shown in FIG. 4(*a*) comprises an int-type size, maxSize, numActve, numContexts, and an array-type contexts of the data structure Context. When an instance of a method size descriptor 340 occurs, the size, maxSize, numActve and numContexts are each initialized using a value of 0. As shown in FIG. 4(*b*) and as described below, the overall actual footprint calculated as the total of the sizes of the contexts corresponding to the method is eventually set in size. The largest size among the sizes of the contexts corresponding to the method is eventually set in maxSize. The number of contexts having a size that is not 0, that is, the number of active contexts among the contexts corresponding to the method, is eventually set in numActive. The number of contexts corresponding to the method, that is, the number of call sites at which the method is inlined among the call sites calling the method, is eventually set in numContexts. All contexts corresponding to the method are set in contexts. The size, maxSize and numActive of any entry in the method size descriptor 340 is also described in the size, maxSize and numActive of the method represented by the entry.

The following is an explanation, with reference to FIG. 4(*b*), of the method used to calculate an actual footprint used in a map composed of the four types of data structures explained above. FIG. 4(*b*) is an example showing pseudo code of the countSize function used to calculate an actual footprint. The countSize function is called when instructions sampled by the estimating unit 224 during runtime are mapped to the maps the instructions belong to. When the sampled instructions are acquired, the estimating unit 224 identifies the entry in the corresponding code array 320 from the address of the instruction using Equation (2) mentioned above. When an access bit has not been set for the entry in the identified code array 320, the estimating unit 224 calls the countSize function in the instance of the inlining context 330 traced from the pointer of the entry in the code array 320, and the actual footprint is counted.

When the countSize function is called, it is first determined whether or not the size of the entry of the inlining context 330 indicated by the pointer passed as an argument (referred to simply as the "current context" below) is 0. When the size is 0, the value of numActive for the entry in the corresponding method size descriptor 340 (referred to simply as the "corresponding method" below) is increased by 1. The size of the current context and the size of the corresponding method are also increased by 1. Next, the maxSize value is updated by the size of the current context when the size of the current context is larger than the maxSize of the corresponding method. Finally, the countSize function is called recursively using the pointer to the entry of the parent inlining context 330 as the argument in order to add the size of the current context to the size of the parent context.

The following is an explanation, with reference to FIG. 5(*a*) and FIG. 5(*b*), of the method used to select a method to uninline using the method size descriptor 340. FIG. 5(*a*) is a diagram showing an example of pseudo code in the computeBenefit function used to calculate the benefit of uninlining. FIG. 5(*b*) is a diagram showing an example of pseudo code in the selectUninliningTarget function used to select a method not to inline. The computeBenefit function and the selectUninliningTarget function are periodically called at a predetermined interval by the selecting unit 226 while executed instructions are being sampled. When the computeBenefit function is called, the benefit value is returned to the method represented by the entry in the method size descriptor 340 indicated by the pointer passed as the argument. The benefit value of this method is calculated by subtracting the maxSize of the method from the size of the method and then dividing the difference by the numActive of the method.

When the selectUninliningTarget function is called, first the target size (targetSize) to be targeted is calculated by multiplying the maximum total value (maxSize) among the total values of the overall actual footprint of each previously calculated method by a predetermined reduction rate (targetReductionRatio). The target size (targetSize) is also subtracted from the current code size to determine the target reduction amount (reducedTarget). If the resulting value is equal to or less than 0, the process is ended. If the value is not equal to or less than 0, the inlined methods are sorted in descending order based on the size of their benefit values determined by the computeBenefit function. The reduction size (reducedSize) is also initialized using 0. A single method is extracted in order from the sorted inlined methods. When the number of active contexts in the extracted current method (numActive) is greater than 1, the current method is registered as a method not to inline, and the reduction value of the current method is added to the reduced size (reducedSize). This processing is repeated until the reduced size (reducedSize) is greater than the target reduction amount (reducedTarget) or until there are no more inlined methods.

Figure 6:
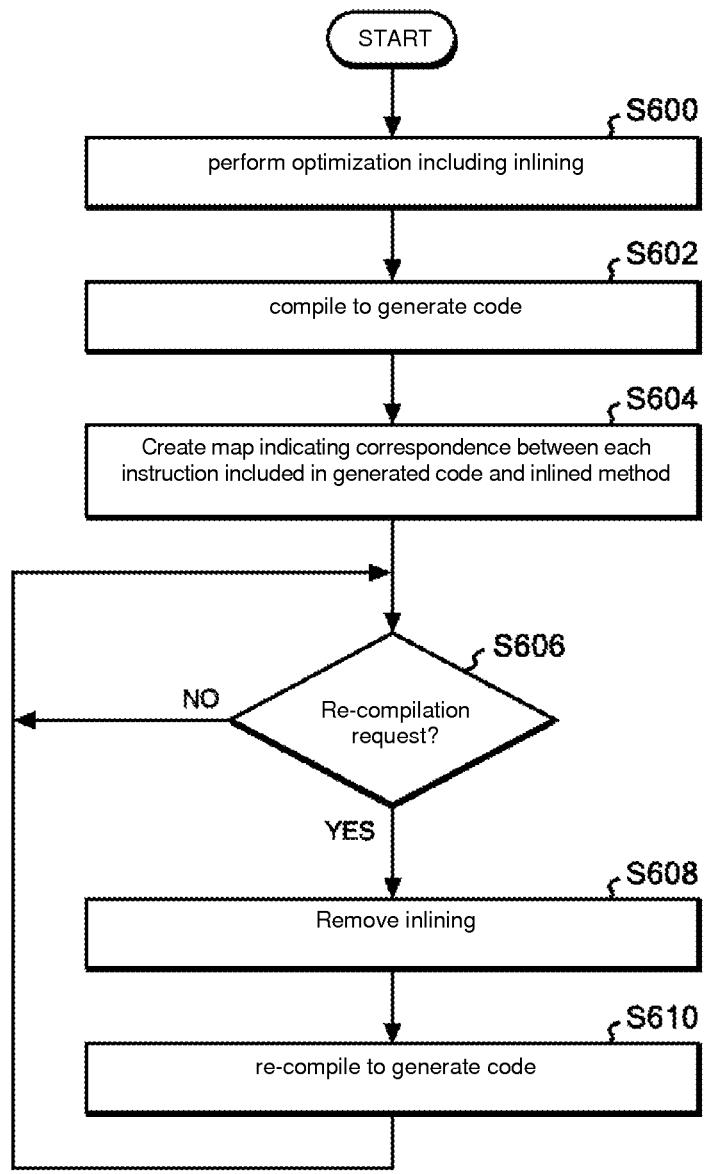
FIG. 6 is a diagram of an example of a flowchart showing the processing performed by a dynamic compiler, according to an embodiment disclosed herein.
Figure 7:
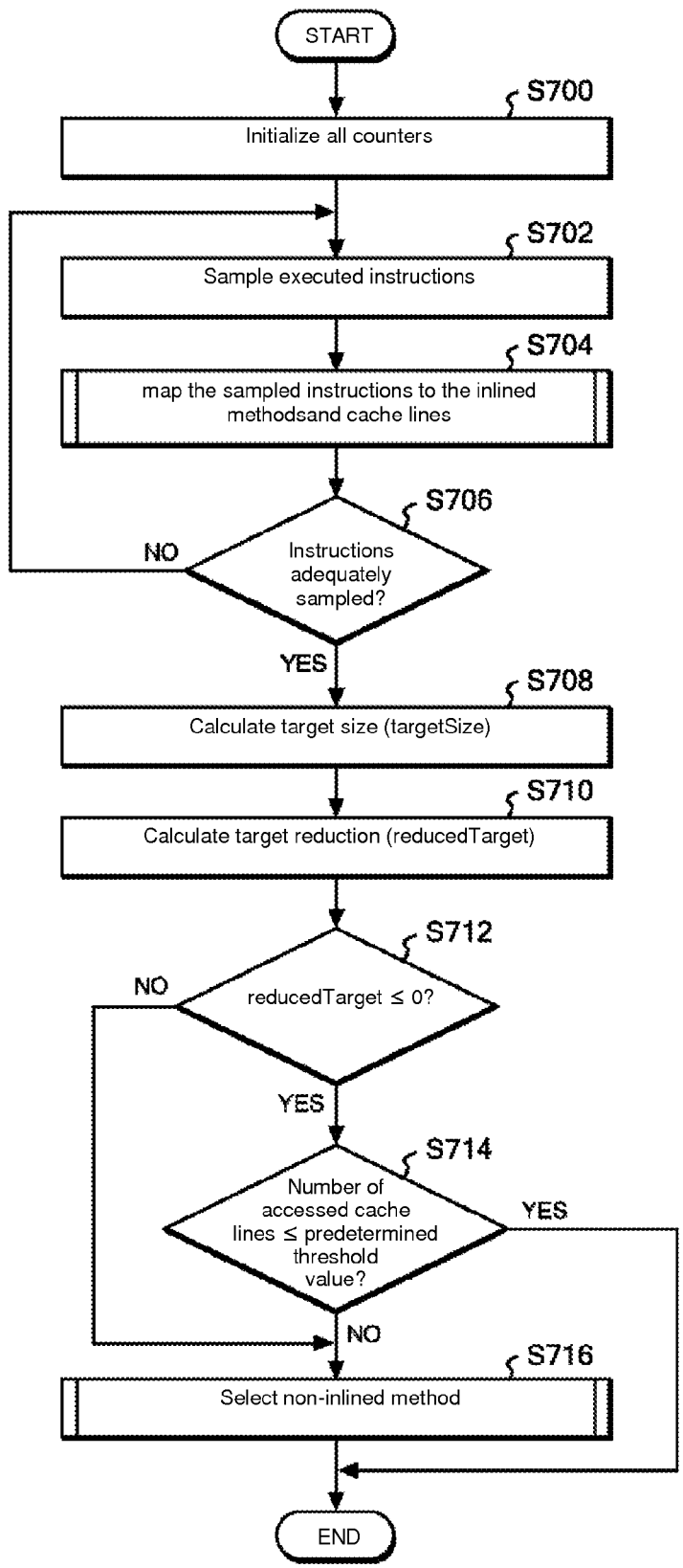
FIG. 7 is a diagram of an example of a flowchart showing all of the processing performed by a profiler, according to an embodiment disclosed herein.
Figure 8:
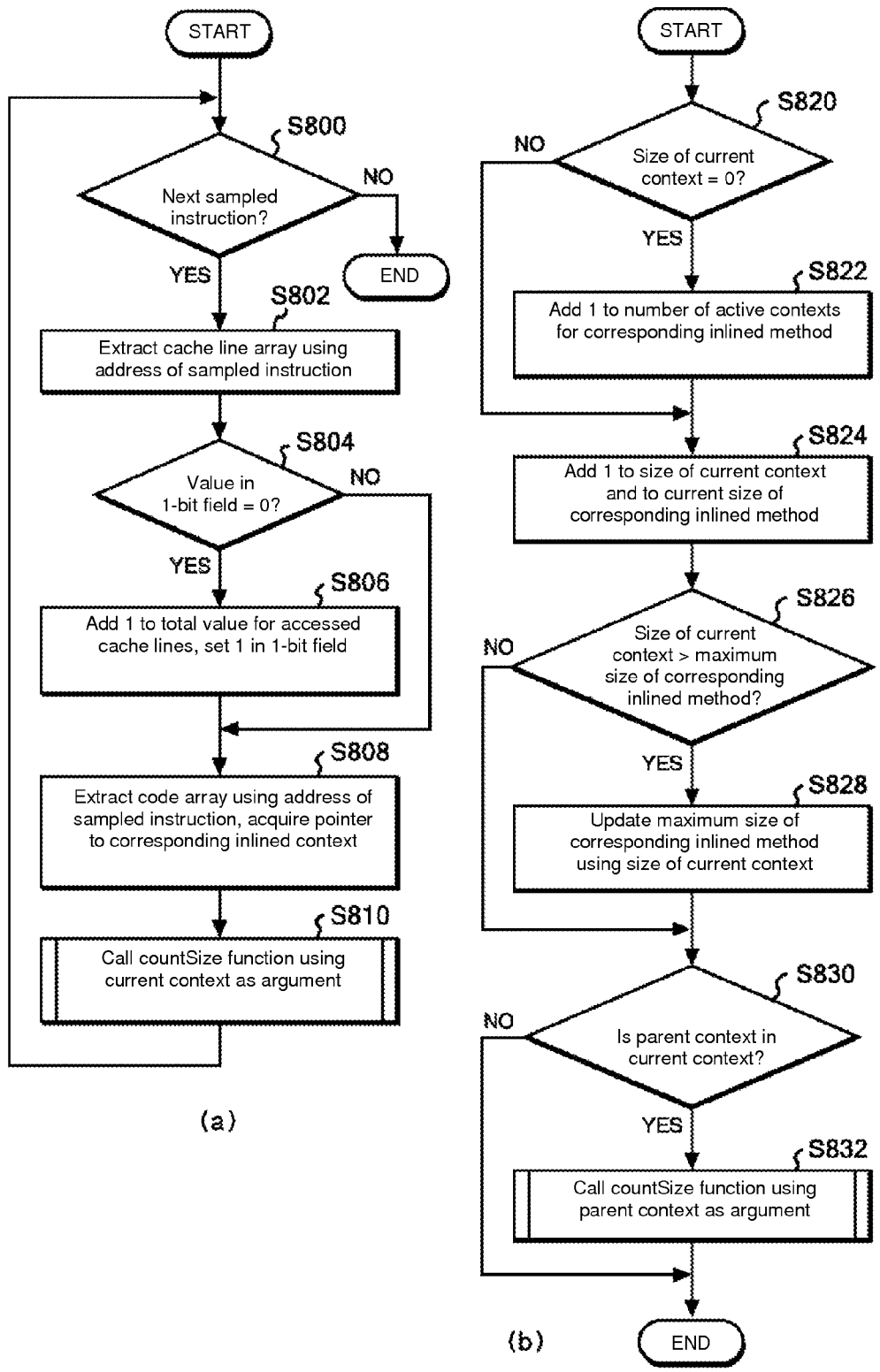
FIG. 8 (a) is a diagram of an example of a flowchart showing the entire actual footprint calculating process, according to an embodiment disclosed herein.
Figure 9:
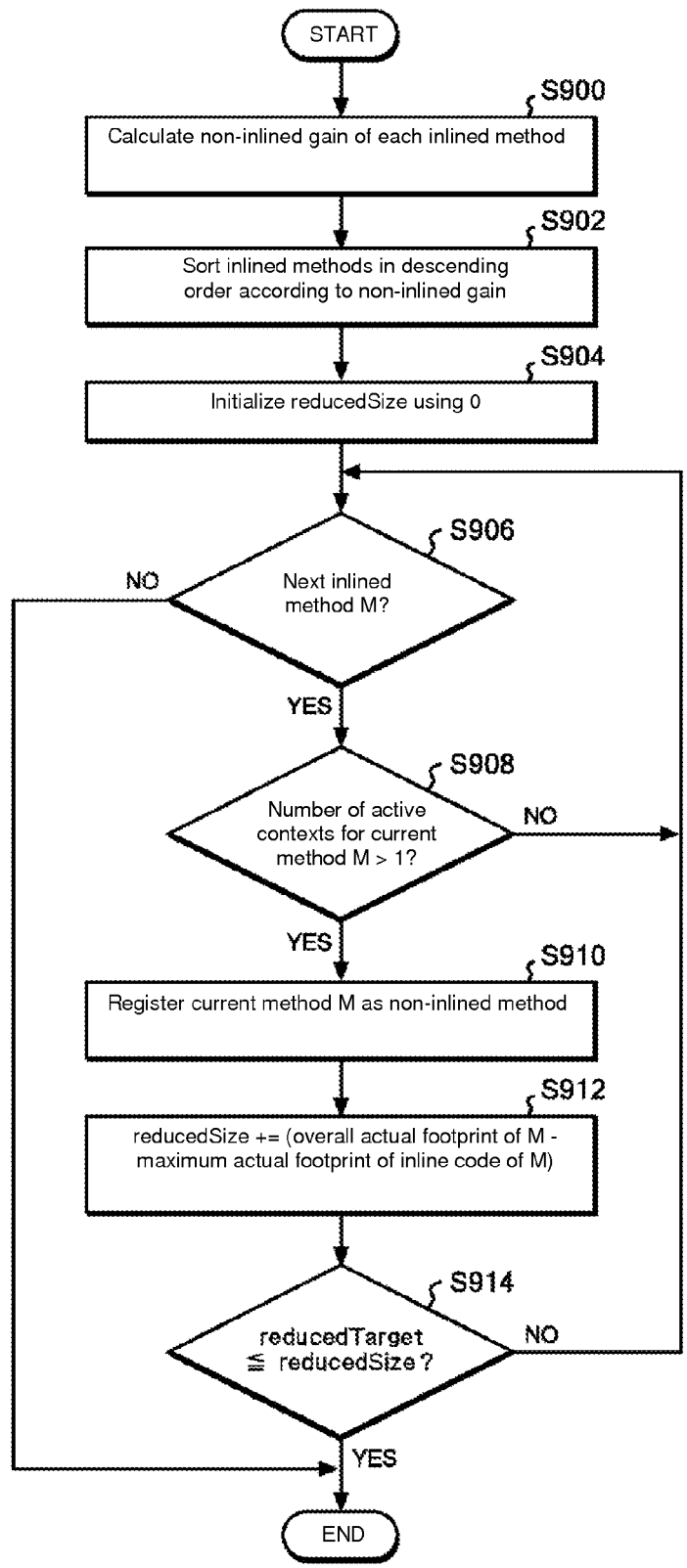
FIG. 9 is a diagram showing an example of a flowchart of the processing for the selectUninliningTargets function, according to an embodiment disclosed herein.

The following is an explanation of the operations performed by the dynamic compiler 228 and the profiler 220 with reference to FIG. 6 through FIG. 9. FIG. 6 is a diagram of an example of a flowchart showing the processing performed by a dynamic compiler 228. FIG. 7 is a diagram of an example of a flowchart showing all of the processing performed by a profiler 220. FIG. 8(*a*) is a diagram of an example of a flowchart showing the entire actual footprint calculating process. FIG. 8(*b*) is a diagram of an example of a flowchart of the processing for the countSize function. FIG. 9 is a diagram showing an example of a flowchart of the processing for the selectUninliningTargets function.

The flowchart shown in FIG. 6 is started when the first type of profiling has been completed by the profiler 220, and the dynamic compiler 228 has acquired the methods to inline and the information on frequently executed program areas that are the results of the first type of inlining. In block S600, the dynamic compiler 228 performs optimization processing, including inlining, on the frequently accessed program area. Next, the dynamic compiler 228 compiles the optimized code and generates native code (block S602).

Next, the dynamic compiler 228 creates a map indicating the correspondence between each instruction included in the generated code and the inlined methods (block S604). Next, the dynamic compiler 228 determines whether or not there was a request for recompiling (block S606). This determination is repeated until a request for recompiling is received (block S606: NO). When there has been a request for recompiling (block S606: YES), the dynamic compiler 228 acquires information on the method to uninline as the result of the second type of profiling from the profiler 220, and releases the inlining for the method to uninline (block S608). Afterwards, the dynamic compiler 228 recompiles the optimized code with released inlining, and generates native code (block S610). Afterwards, the profiler returns to block S606 and repeats this series of processes.

The flowchart shown in FIG. 7 is periodically started at predetermined intervals while executing compiled code on the basis of the results of the first type of profiling and while executing recompiled code on the basis of the results of the second type of profiling. In block S700, the profiler 220 initializes all counters. Next, the profiler 220 samples the executed instructions using the hardware performance counter (block S702). Next, the profiler 220 maps the sampled instructions to the inlined methods and cache lines using the map created by the dynamic compiler 228, and calculates the actual footprint of the inlined methods and the number of accessed cache lines (S704S704). The details of these calculations will be explained below with reference to FIG. 8(*a*) and FIG. 8(*b*). Next, the profiler 220 determines whether or not the instructions have been adequately sampled (S704S706). When it has been determined that the instructions have not been adequately sampled (S704S706: NO), the profiler 220 returns to the process in S704S702.

When it has been determined that the instructions have been adequately sampled (S704S706: YES), the profiler 220 calculates the target size (targetSize) to be targeted for native code (S708). As mentioned above, the target size can be obtained by multiplying the maximum value for the total value of the overall actual footprint for each previously calculated method by a predetermined reduction rate. In the initial sampling, the target size is the size of the current native code multiplied by a predetermined reduction rate. Next, the profiler 220 calculates the target reduction amount (reducedTarget) by subtracting the target size from the size of the current native code (S704S710).

Next, the profiler 220 determines whether or not the value of the target reduction amount (reducedTarget) is zero or less (S712). When the value of the target reduction amount (reducedTarget) is zero or less (block S712: YES), the profiler 220 next determines whether or not the number of accessed cache lines is equal to or less than a predetermined threshold value (S714). When the number of accessed cache lines is equal to or less than the predetermined threshold value (block S714: YES), the profiler 220 ends the process. When the number of accessed cache lines is greater than the predetermined threshold value (block S714: NO), the profiler advances the process to block S716, selects the method to be released from inlining on the basis of the actual footprint of the inlined methods, and then ends the process.

FIG. 8(*a*) shows in greater detail the processing performed in S704 of the flowchart shown in FIG. 7. The process starts in block S800 where the profiler 220 determines whether or not there is another sampled instruction. When there are no more sampled instructions (block S800: NO), the profiler 220 ends the process. When there is another sampled instruction (block S800: YES), the profiler 220 calculates the cache line offset from the address of the sampled instruction using Equations (1) and (2) described above, and identifies the entry of the corresponding cache line array (S802).

Next, the profiler 220 determines whether or not the value of the 1-bit field of the identified entry is zero (block S804). When the value of the 1-bit field of the identified entry is zero (block S804: YES), the profiler 220 increases the total value of the accessed cache lines by one, and sets the value of the 1-bit field of the identified entry to one (block S806). When the value of the 1-bit field of the identified entry is not zero (block S804: NO), the profiler 220 advances the process to S808, calculates the code offset from the address of the sampled instruction using Equation (2) described above, uses this to identify the entry in the corresponding code array, and acquires the pointer to the inlined context corresponding to the sampled instruction. Next, the profiler 220 calls the countSize function using the pointer acquired in block S808 as the argument (block S810), and then returns the process to block S800. The details of the processing performed by the countSize function will be explained below with reference to FIG. 8(*b*).

The flowchart shown in FIG. 8(*b*) shows the details of the processing performed in S810 of the flowchart shown in FIG. 8(*a*). The process starts in block S820 where the profiler 220 determines whether or not the size of the current context is 0 using, as the current context, the context represented by the entry in the inlining context 330 indicated by the pointer passed as the argument. Then, the profiler 220 increases numActive of the inlined method corresponding to the current context by one (block S822).

Next, the profiler 220 increases the size of the current context and the current size of the corresponding inlined method by one (block S824). Next, the profiler 220 determines whether or not the size of the current context is greater than the maxSize of the corresponding inlined method (block S826). When the size of the current context is greater than the maxSize of the corresponding inlined method (block S826: YES), the maxSize of the corresponding inlined method is updated using the size of the current context (block S828).

When the size of the current context is equal to or less than the maxSize of the corresponding inlined method (block S826: NO) or after block S828 has been completed, the profiler 220 advances to block S830, where it determines whether or not there is a context with a parental relationship to the current context. When there is a context with a parental relationship (block S830: YES), the profiler 220 recursively calls the countSize function using the pointer indicating the parental context as the argument (block S832). When there is no context with a parental relationship (block S830: NO) or after block S832 has been completed, the profiler 220 ends the process.

The flowchart shown in FIG. 9 shows the details of the processing performed in block S716 of the flowchart shown in FIG. 7. The process starts in block S900, where the profiler 220 uses the method described above to calculate a benefit value that indicates the size of the benefit to be obtained by excluding each inlined method from the objects to be inlined. Next, the profiler 220 sorts the inlined methods in descending order according to the size of the calculated benefit values (block S902). Next, the profiler 220 initializes the reduced size (reduceSize) with zero.

Next, the profiler 220 determines whether or not there is another method M to be processed among the inlined methods sorted in descending order according to the size of the benefit value (block S906). When there is another method M to be processed (block S906: YES), the profiler 220 uses this method M to determine whether or not the numActive of the current method M is greater than one (block S908). When the numActive of the current method M is equal to or less than one (block S908: NO), the profiler 220 returns to block S906 and repeats the series of processes. When the numActive of the current method M is greater than one (block S908: YES), the profiler 220 registers the current method M as a method not to inline (block S910).

Next, the profiler 220 subtracts the largest size among the sizes of the contexts corresponding to the current method M from the size (overall real footprint) of the current method M, and adds the difference to the reduced size (reduceSize) (block S912). Next, the profiler 220 determines whether or not the reduced size (reduceSize) is equal to or greater than the target reduction amount (reducedTarget) obtained in block S710 of FIG. 7 (S914). When the reduced size (reduceSize) is less than the target reduction amount (reducedTarget) (block S914: NO), the profiler 220 returns to block S906 and repeats the series of processes. When the reduced size (reduceSize) is equal to or greater than the target reduction amount (reducedTarget) (block S914: YES) or when there are no more methods M to process in block S906 (block S906: NO), the profiler 220 ends the process.

Figure 10:
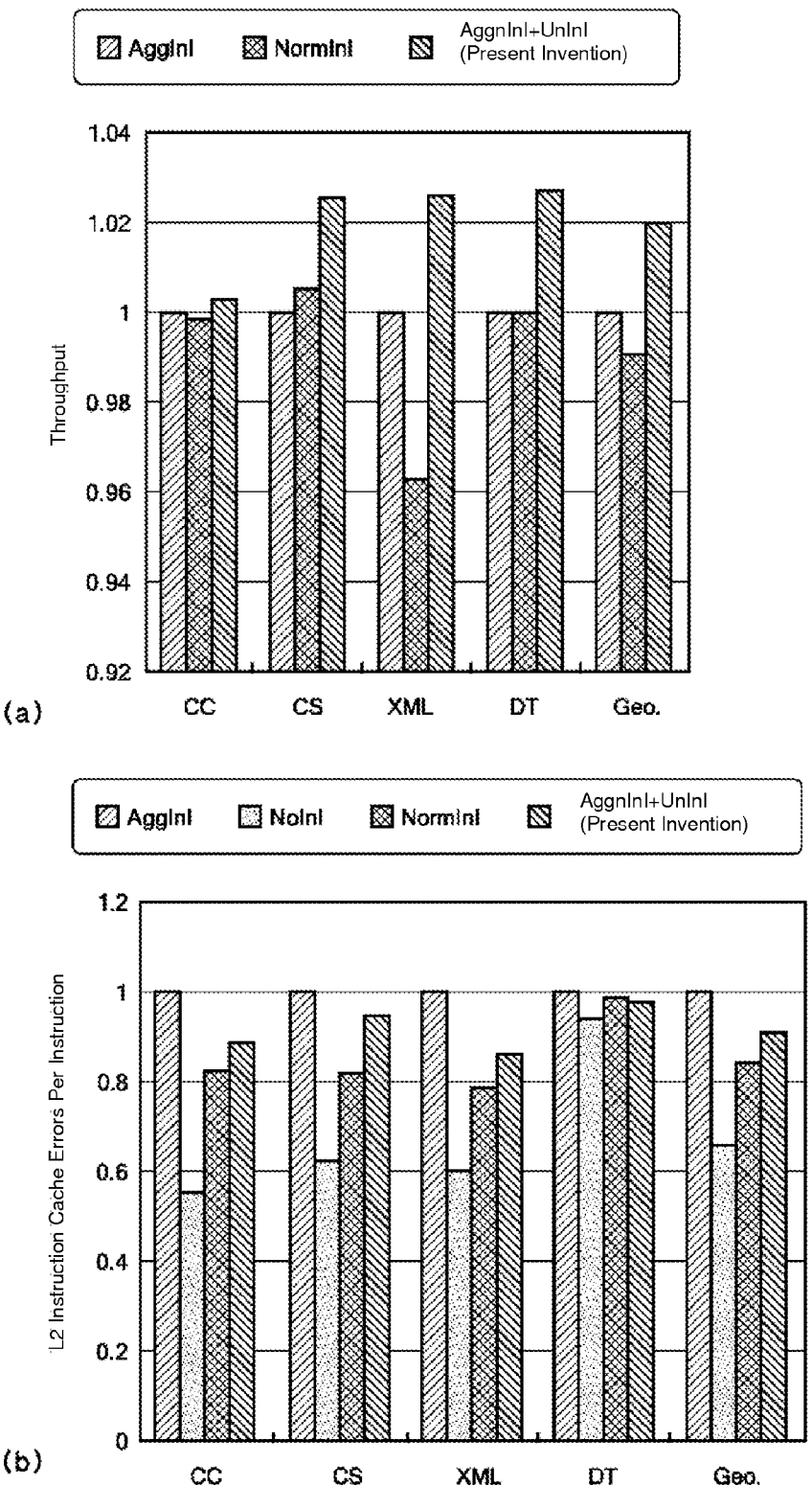
FIG. 10 (a) is a diagram showing test results for throughput, according to an embodiment disclosed herein.
Figure 11:
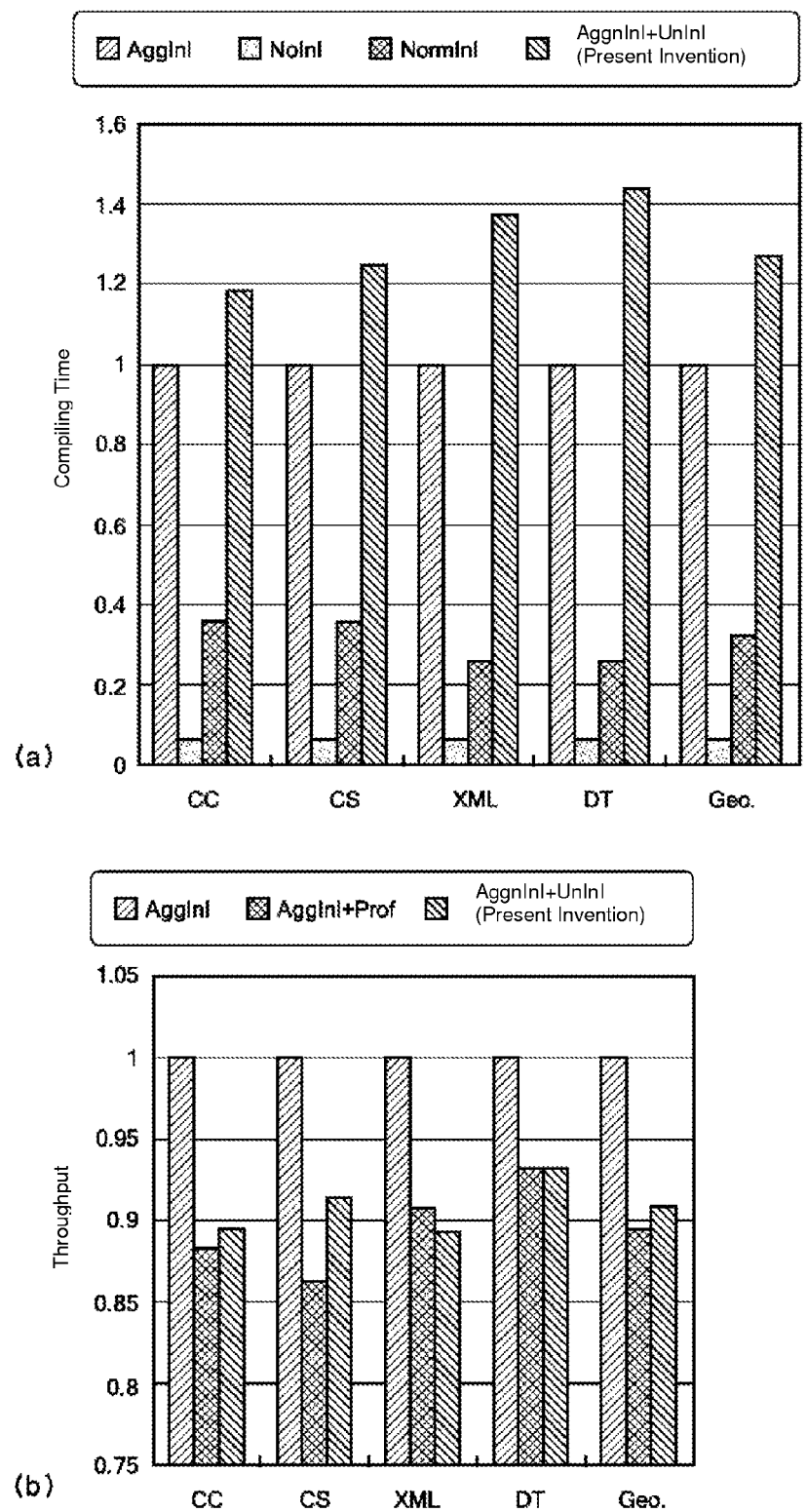
FIG. 11 (a) is a diagram showing test results for compilation times, according to an embodiment disclosed herein.

The following is an explanation of the test results of the present invention with reference to FIG. 10 and FIG. 11. The test conditions were as follows.

Target of Implementation

IBM™ Java™ just-in-time (JIT) compiler, 64-bit platform, dual-core, 3.84 GHz Power 7™ processor, AIX™ 6.1 operating system Used Benchmarks CC (compiler.compiler), CS (compiler.sunflow), XML (xml.transform), DT (DayTrader/WebSphere8.5) with large actual footprints included in SPEC jvm2008

Operation of Profiler Using Present Invention

Wait 360 seconds after start of Java™ virtual machine for an ordinary compiler to finish; target 10% reduction in overall actual footprint by sampling instructions for 60 seconds and then calculating the actual footprint of each method Targets of Comparison AggInl: Use of aggressive inlining threshold value for applications running for a long period of time such as a server NoInl: Inlining not performed NormInl: Use of standard inlining threshold value for client applications AggInl+UnInl: Present invention AggInl+Prof: Profiling from the present invention only (for measuring overhead)

AggInl+HPM: HPM counter from the present invention only (for measuring overhead)

FIG. 10(a) is a diagram showing the results of a throughput test. All four graphs explained below use the AggInl value as the base, and the graph in FIG. 10(a) compares peak performance after compiling has been completed. As shown in FIG. 10(a), using techniques disclosed herein improved performance by an average of 2% and by a maximum of 2.7% (DT), as compared to conventional techniques. Since the maximum performance improvement was observed in a DT operated by a web application, embodiments disclosed herein are clearly applicable to an application that runs for a long time. No improvement was observed in performance excluding CS from NormInl using a standard inlining threshold value. Therefore, it is clearly difficult to improve performance by reducing the inlining threshold value using a large-sized application.

FIG. 10(b) is a diagram showing the results of a test of instruction cache misses. As shown, some embodiments disclosed herein reduce (XML) L2 instruction cache misses an average of 10% and by a maximum of 16% because inlining is released and the overall actual footprint reduced 10% after inlining has been performed using an aggressive inlining threshold value. NoInl in which no inlining was performed and NormInl in which a standard inlining threshold value was used both had fewer cache misses than the technique of the present invention. However, as explained with relation to FIG. 10 (a), no improvement in performance excluding CS was observed using NormInl. Even though the number of cache misses was reduced, the path length was increased because of the standard inlining threshold value. The result was poorer performance.

FIG. 11 (a) is a diagram showing the results of compilation time test. FIG. 11 (b) is a diagram showing results of an overhead test. Using techniques disclosed herein, profiling and recompiling were performed to release inlining after inlining had been performed using an aggressive inlining threshold value. As a result, compiling times increased by 30% and an average profiling overhead of 11% was observed. However, as mentioned above, the increased compiling time is not a problem if the technique of the present invention is applied to an application that runs for a long time. For example, the compiling can be performed when the load is low. By reducing the instruction sampling frequency (that is, by increasing the sampling time), the overhead of the profiler can be reduced without a loss of accuracy in actual footprint measurements. In this test, the sampling frequency for instructions using HPM was maximized in order to reduce the execution times, and this increased the overhead. The overhead is eliminated after optimization because the profiler is inactive.

Although the present invention was explained using embodiments, but the technical scope of the present invention is not limited to the embodiment described above. The possibility of many changes and improvements to this embodiment should be apparent to those skilled in the art. Embodiments including these changes and improvements are naturally within the technical scope of the present invention.

The order of execution for operations, steps and processes in the devices, systems, programs and methods described in the claims, specification and drawings was described using such terms as "previous" and "prior". However, these operations, steps and processes can be realized in any order as long as the output of the previous process is used by the subsequent process. Also, even when there are situations in which the output of the previous process is used by the subsequent process, there may be situations in which another process is inserted between the previous process and the subsequent process. Even when another process is inserted between them, there may be a modification in which the previous process is performed immediately prior to the subsequent process. The operational flow in the claims, description and drawing were explained using terms such as "first", "next" and "then" for the sake of convenience. However, the operational flow does not necessarily have to be executed in this order.

What is claimed is:

1. A computer-implemented method for calculating an actual footprint of code methods in compiled code, the computer-implemented method comprising:

creating, in a computer, a map, wherein the map indicates which code method, in a plurality of code methods, each instruction in the compiled code belongs to;

sampling a plurality of executed instructions using a hardware performance counter in the computer;

using the created map to map, in the computer, the sampled instructions to the code methods to which the instructions belong by identifying an address of each of the sampled instructions, and mapping each of the sampled instructions to the created map by determining whether the address of a sampled instruction is in a data range of one of the code methods or the plurality of code methods; and calculating the actual footprint of each code method as the total number of executed instructions sampled at least once among the instructions belonging to the code methods, wherein the calculating the actual footprint of each code method further comprises:

calculating the size of each context generated by inclining the code method as the total number of instructions sampled at least once among the instructions constituting the context; and calculating the total size of the plurality of contexts corresponding to the code method as the overall actual footprint of the code method, and determining one of the code methods to inline, wherein determining one of the code methods to inline comprises:

determining the method for removing the inlining among the code inlined methods on the basis of the overall actual footprint calculated for each code method;

obtaining, as a reduction value for each code method, a value calculated by subtracting the largest size of the sizes of the plurality of contexts corresponding to the code method from the overall actual footprint of the code method;

subtracting the reduction value of each method from the size of the compiled code in descending order according to size until the size of the compiled code is equal to or less than a target code size; and determining, as the method for removing the inlining, a code method in which the reduction values have been subtracted; and dividing the reduction value of each code method by the number of contexts having a size not equal to zero among the plurality of contexts corresponding to the code method, the dividing producing a benefit value, the method further comprising subtracting the reduction value of each code method from the size of the compiled code in descending order according to the size of the benefit value of each code method.

2. The method of 1, wherein the map indicates the correspondence relationship between each instruction included in the compiled code and the Wined method to which the instruction belongs, and wherein the determining one of the plurality of code methods to inline further includes removing the inlining among the inlined code methods based on the actual footprint calculated for each code method.

3. The method of 1, wherein determining one of the code methods to inline further comprises excluding, from the code methods for removing inlining, any code method not having a plurality of contexts whose size is not equal to zero.

4. The method of 1, wherein determining one of the code methods to inline further comprises excluding, from the code methods for removing inuring, any code method included among the compiled code methods as a root code method.

5. The method of 1, wherein determining one of the code methods to inline further comprises calculating, as the target code size, a value obtained by multiplying, by a predetermined rate of reduction, the largest value among previously calculated total values for the overall actual footprint of each code method.

6. The method of 1, further comprising pausing for a fixed period of time the determining one of the code methods to inline in response to the size of the compiled code being less than the target code size.

7. The method of 1, further comprising
counting the number of cache lines used to store the sampled instructions; and
pausing for a led period of time the determining one of the code methods to inline when the size of the compiled code is less than predetermined threshold value.

8. A system for calculating the actual footprint of code methods in compiled code, the system comprising:
a memory having computer readable computer instructions; and
a processor for executing the computer readable instructions, the instructions including:
creating a map indicating which code method, of a plurality of code methods, each instruction in the compiled code belongs to;
sampling a plurality of executed instructions using a hardware performance counter in the computer; and
using the created map to map, in the computer, the sampled instructions to the code methods to which the instructions belong by identifying an address of each of the sampled instructions, and mapping each of the sampled instructions to the created map by determining whether the address of a sampled instruction is in a data range of one of the code methods of the plurality of code methods; and
calculating the actual footprint of each code method as the total number of executed instructions sampled at least once among the instructions belonging to the code methods, wherein the calculating the actual footprint of each code method further comprises:
calculating the size of each context generated by inlining the code method as the total number of instructions sampled at least once among the instructions constituting the context; and
calculating the total size of the plurality of contexts corresponding to the code method as the overall actual footprint of the code method,
determining one of the code methods to inline, wherein determining one of the code methods to inline comprises:
determining the method for removing the inlining among the code inlined methods on the basis of the overall actual footprint calculated for each code method;
obtaining, as a reduction value for each code method, a value calculated by subtracting the largest size of the sizes of the plurality of contexts corresponding to the code method from the overall actual footprint of the code method;
subtracting the reduction value of each method from the site of the compiled code in descending order according to size until the size of the compiled code is equal to or less than a target code size;
determining, as the method for removing the inlining, a code method in which the reduction values have been subtracted; and
dividing the reduction value of each code method by the number of contexts having a size not equal to zero among the plurality of contexts corresponding to the code method, the dividing producing a benefit value, the method further comprising subtracting the reduction value of each code method from the size of the compiled code in descending order according to the size of the benefit value of each code method.

9. The system of 8, wherein the map indicates the correspondence relationship between each instruction included in the compiled code and the inlined method to which the instruction belongs, and wherein the determining one or the plurality of code methods to inline further includes removing the miming among the inlined code methods based on the actual footprint calculated for each code method.

10. The system 8, the instructions further comprising
counting the number of cache lines used to store the sampled instructions; and
pausing for a fixed period of time the determining one of the code methods to inline when the size of the compiled code is less than predetermined threshold value.

11. A non-transitory computer readable product comprising:
a computer readable storage medium having program code embodied therewith, the program code executable by a processor for:
creating a map indicating to which code method each instruction included in compiled code belongs:
sampling a plurality of executed instructions using a hardware performance counter in the processor; and
using the created map to map the sampled instructions to the code methods to which the instructions belong by identifying an address of each of the sampled instructions, and mapping each of the sampled instructions to the created map by determining whether the address of a sampled instruction is in a data range of one of the code methods of the plurality of code methods; and
calculating the actual footprint of each code method as the total number of executed instructions sampled at least once among the instructions belonging to the code methods, wherein the calculating the actual footprint of each code method further comprises:
calculating the site of each context generated by inlining the code method as the total number of instructions sampled at least once among the instructions constituting the context; and
calculating the total size of the plurality of contexts corresponding to the code method as the overall actual footprint of the code method;
determining one of the code methods to inline, wherein determining one of the code methods to inline comprises:
determining the method for removing the inlining among the code inlined methods on the basis of the overall actual footprint calculated for each code method;
obtaining, as a reduction value for each code method, a value calculated by subtracting the largest size of the sizes of the plurality of contexts corresponding to the code method from the overall actual footprint of die code method;
subtracting the reduction value of each method from the size of the compiled code in descending order according to size until the size of the compiled code is equal to or less than a target code size;
determining, as the method for removing the inlining, a code method in which the reduction values have been subtracted; and
dividing the reduction value of each code method by the number of contexts having a size not equal to zero among the plurality of contexts corresponding to the code method, the dividing producing a benefit value, the method further comprising subtracting the reduction value of each code method from the size of the compiled code in descending order according to the size of the benefit value of each code method.

12. The product of 11, wherein the map indicates the correspondence relationship between each instruction included in the compiled code and the inlined method to which the instruction belongs, and wherein the program code is further executable for removing the inlining among the inlined code methods based on the actual footprint calculated for each code method.

* * * * *